United States Patent
Alamoudi et al.

(10) Patent No.: US 12,434,192 B2
(45) Date of Patent: *Oct. 7, 2025

(54) METHOD AND SYSTEM FOR EXTRACTION OF MINERALS BASED ON DIVALENT CATIONS FROM BRINE

(71) Applicant: Saudi Water Authority, Riyadh (SA)

(72) Inventors: Ahmed Saleh Mohammed Alamoudi, Al-Jubail (SA); Mohammed Farooque Ayumantakath, Al-Jubail (SA); Nikolay Voutchkov, Winter Springs, FL (US); Seungwon Ihm, Al-Khobar (SA); Christopher Michael Fellows, Al-Jubail (SA); Eslam Alwaznani, Al-Jubail (SA)

(73) Assignee: SAUDI WATER AUTHORITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,741

(22) Filed: Aug. 30, 2023

(65) Prior Publication Data

US 2023/0405526 A1 Dec. 21, 2023

Related U.S. Application Data

(63) Continuation of application No. 17/644,121, filed on Dec. 14, 2021, now Pat. No. 11,806,668.

(51) Int. Cl.
| | | |
|---|---|---|
| *C01F 5/34* | (2006.01) | |
| *B01D 9/00* | (2006.01) | |
| *B01D 9/02* | (2006.01) | |
| *B01D 61/02* | (2006.01) | |
| *C01F 11/46* | (2006.01) | |

(52) U.S. Cl.
CPC ......... *B01D 61/026* (2022.08); *B01D 9/0059* (2013.01); *B01D 9/02* (2013.01); *C01F 5/34* (2013.01); *C01F 11/468* (2013.01); *B01D 2009/0086* (2013.01)

(58) Field of Classification Search
CPC .......... C01F 5/34; C01F 11/468; B01D 61/02; B01D 9/00
See application file for complete search history.

(56) References Cited

U.S. PATENT DOCUMENTS

| | | |
|---|---|---|
| 1,505,202 A | 8/1924 | Judd et al. |
| 2,163,877 A | 6/1939 | Hooker |
| 2,405,055 A | 7/1946 | Robinson et al. |
| 2,536,457 A | 1/1951 | Martin |
| 2,772,143 A | 11/1956 | McIlhenney et al. |
| 4,180,547 A | 12/1979 | Chirico |
| 4,314,985 A | 2/1982 | Bonney |
| 4,392,959 A | 7/1983 | Coillet |
| 5,238,574 A | 8/1993 | Kawashima et al. |
| 5,676,832 A | 10/1997 | Katraro et al. |
| 6,113,797 A | 9/2000 | Al-Samadi |
| 6,508,936 B1 | 1/2003 | Hassan |
| 7,037,481 B2 | 5/2006 | Becenel, Jr. |
| 7,083,730 B2 | 8/2006 | Davis |
| 7,314,606 B2 | 1/2008 | Sridhar et al. |
| 7,563,375 B2 | 7/2009 | Liberman |
| 8,128,821 B2 | 3/2012 | Oklejas, Jr. |
| 8,133,469 B2 | 3/2012 | Sauer et al. |
| 8,501,034 B2 | 8/2013 | Hook et al. |
| 9,005,404 B2 | 4/2015 | Batty et al. |
| 9,045,351 B2 | 6/2015 | Wallace |
| 9,206,060 B1 | 12/2015 | Abusharkh |
| 9,233,340 B1 | 1/2016 | Elish et al. |
| 9,427,705 B1 | 8/2016 | Abusharkh |
| 9,808,764 B2 | 11/2017 | Oklejas, Jr. |

(Continued)

FOREIGN PATENT DOCUMENTS

| | | |
|---|---|---|
| CN | 101125669 | 2/2008 |
| CN | 102311097 | 1/2012 |

(Continued)

OTHER PUBLICATIONS

"Chemical Treatment for RO and NF", Hydranautics: Nitto Group Company, Technical Application Bulletin No. 111, pp. 1-16, May 2017.

(Continued)

*Primary Examiner* — Sikarl A Witherspoon
(74) *Attorney, Agent, or Firm* — NORTON ROSE FULBRIGHT US LLP

(57) ABSTRACT

A system and method for producing minerals from divalent ion-containing brine stream includes rejecting sulfate from a divalent-ion rich reject stream in a first nanofiltration seawater reverse osmosis (NF-SWRO) unit, producing solid calcium sulfate dihydrate and a magnesium-rich brine stream in a first concentration unit, concentrating the magnesium-rich brine stream to a saturation point of sodium chloride in a second concentration unit, producing solid sodium chloride and a supernatant product stream in a first crystallizing unit, produce a concentrated magnesium-rich bittern stream from the supernatant product stream in a third concentration unit, and at least one of producing hydrated magnesium chloride from the concentrated magnesium-rich bittern stream in a second crystallizing unit and producing anhydrous magnesium chloride by prilling the concentrated magnesium-rich bitterns stream under a hydrogen chloride atmosphere in a dry air process unit.

20 Claims, 1 Drawing Sheet

(56) References Cited

U.S. PATENT DOCUMENTS

| | | |
|---|---|---|
| 10,005,688 B2 | 6/2018 | Sekine et al. |
| 10,052,589 B2 | 8/2018 | Oklejas, Jr. |
| 10,071,929 B2 | 9/2018 | Sekine et al. |
| 10,202,291 B2 | 2/2019 | Tokunaga et al. |
| 10,214,437 B2 | 2/2019 | Blohm et al. |
| 10,214,438 B2 | 2/2019 | Blohm et al. |
| 10,245,555 B2 | 4/2019 | St. John et al. |
| 10,300,436 B2 | 5/2019 | Townsend et al. |
| 10,603,635 B2 | 3/2020 | Wei et al. |
| 10,626,037 B2 | 4/2020 | Lienhard et al. |
| 10,843,951 B2 | 11/2020 | Fitzpatrick et al. |
| 10,845,067 B2 | 11/2020 | Martin |
| 10,947,143 B2 | 3/2021 | Alamoudi et al. |
| 11,230,479 B2 | 1/2022 | Mack et al. |
| 11,247,174 B2 | 2/2022 | Liu et al. |
| 11,279,643 B2 | 3/2022 | Lahav et al. |
| 2002/0166823 A1 | 11/2002 | Mukhopadhyay |
| 2004/0211726 A1 | 10/2004 | Baig et al. |
| 2005/0067341 A1 | 3/2005 | Green et al. |
| 2006/0157409 A1 | 7/2006 | Hassan |
| 2006/0157410 A1 | 7/2006 | Hassan |
| 2007/0080113 A1 | 4/2007 | Vuong |
| 2007/0246406 A1 | 10/2007 | Dibel et al. |
| 2010/0192575 A1 | 8/2010 | Al-Mayahi et al. |
| 2011/0049054 A1 | 3/2011 | Merryman et al. |
| 2013/0270186 A1 | 10/2013 | Wohlert |
| 2014/0021135 A1 | 1/2014 | Sawyer et al. |
| 2014/0216934 A1 | 8/2014 | Fu et al. |
| 2014/0299546 A1 | 10/2014 | Eckert et al. |
| 2015/0014248 A1 | 1/2015 | Herron et al. |
| 2015/0053085 A1 | 2/2015 | Mahley, III |
| 2015/0136699 A1 | 5/2015 | Wohlert |
| 2015/0352498 A1 | 12/2015 | Raman |
| 2016/0176728 A1 | 6/2016 | Lo et al. |
| 2016/0339390 A1 | 11/2016 | Abusharkh |
| 2017/0144106 A1 | 5/2017 | McCool et al. |
| 2017/0349465 A1 | 12/2017 | Blohm et al. |
| 2017/0349467 A1 | 12/2017 | Blohm et al. |
| 2018/0015415 A1 | 1/2018 | Nicoll et al. |
| 2018/0236406 A1 | 8/2018 | St. John et al. |
| 2019/0054421 A1 | 2/2019 | Wei et al. |
| 2019/0322548 A1 | 10/2019 | Mack et al. |
| 2020/0023317 A1 | 1/2020 | Zhai et al. |
| 2020/0316526 A1 | 10/2020 | Nicoll et al. |
| 2021/0261445 A1 | 8/2021 | Nakamura et al. |
| 2021/0322929 A1 | 10/2021 | Mack et al. |
| 2022/0119281 A1 | 4/2022 | Mack et al. |
| 2022/0249983 A1 | 8/2022 | Holtzapple |
| 2022/0258102 A1 | 8/2022 | Townsend et al. |
| 2023/0399244 A1 | 12/2023 | Alamoudi et al. |
| 2024/0158276 A1 | 5/2024 | Alamoudi et al. |

FOREIGN PATENT DOCUMENTS

| | | |
|---|---|---|
| CN | 105366697 | 3/2016 |
| CN | 106115741 | 11/2016 |
| CN | 109092065 | 12/2018 |
| CN | 109354047 | 2/2019 |
| CN | 110064305 | 7/2019 |
| CN | 111484178 | 8/2020 |
| CN | 109502613 | 11/2020 |
| GB | 2395946 | 6/2004 |
| GB | 2394678 | 5/2024 |
| JP | 10225683 | 8/1998 |
| SU | 922071 | 4/1982 |
| WO | WO 2000/029326 | 5/2000 |
| WO | WO 2000/029327 | 5/2000 |
| WO | WO 2006/087302 | 8/2006 |
| WO | WO 2010/077895 | 7/2010 |
| WO | WO 2010/132104 | 11/2010 |
| WO | WO 2013/033841 | 3/2013 |
| WO | WO 2013/131183 | 9/2013 |
| WO | WO 2017/030937 | 2/2017 |
| WO | WO 2017/136048 | 8/2017 |
| WO | WO 2020/041160 | 2/2020 |
| WO | WO 2021/026498 | 2/2021 |
| WO | WO 2021/221462 | 11/2021 |
| WO | WO 2022/061197 | 3/2022 |
| WO | WO 2022/126671 | 6/2022 |
| WO | WO 2022/153980 | 7/2022 |

OTHER PUBLICATIONS

Altaee et al., "Alternative design to dual stage NF seawater desalination using high rejection brackish water membranes", *Desalination*, 273(2-3), pp. 391-397, 2011.

Bartholomew, T.V. et al., "Osmotically Assisted Reverse Osmosis for High Salinity Brine Treatment", *Desalination*, 421, pp. 3-11, 2017.

Birnhack et al., "Implementation, Design and Cost Assessment of a Membrane-Based Process for Selectively Enriching Desalinated Water with Divalent Seawater Ions", *ChemEngineering*, (2018), 2, 41, pp. 1-13.

Davenport et al., "High-Pressure Reverse Osmosis for Energy-Efficient Hypersaline Brine Desalination: Current Status, Design Considerations, and Research Needs", *Environmental Science & Technology Letters*, Jun. 29, 2018, pp. 467-475 vol. 5.

Extended European Search Report issued in European Application No. 19923420.4, dated Apr. 24, 2023.

Gräber et al., "A pre-treatment concept for increasing the recovery ratio of coastline BWRO plants, while providing Mg2+ in the product water", *Desalination*, 515 (2021), pp. 1-10.

International Search Report & Written Opinion issued in PCT Application No. PCT/IB2022/062168, dated Mar. 2, 2023.

International Search Report & Written Opinion issued in PCT Application No. PCT/IB2022/062404, dated Mar. 3, 2023.

International Search Report & Written Opinion issued in PCT Application No. PCT/US2019/026804, dated Jul. 3, 2019.

International Search Report & Written Opinion issued in PCT Application No. PCT/US2019/047751, dated Oct. 29, 2019.

Loganathan, P. et al., "Mining valuable minerals from seawater: a critical review", *Environmental Science Water Research & Technology*, 3, pp. 37-53, 2017.

Meijer et al., "Solubilities and Supersaturations of Calcium Sulfate and Its Hydrates in Seawater", *Desalination*, vol. 51 (1984), pp. 255-305.

Nativ et al., "DiaNanofiltration-based method for inexpensive and selective separation of Mg2+ and Ca2+ ions from seawater, for improving the quality of soft and desalinated waters", *Separation and Purification Technology*, 166 (2016), pp. 83-91.

Nativ et al., "Desalinated brackish water with improved mineral composition using monovalent-selective nanofiltration followed by reverse osmosis", *Desalination*, 520 (2021), pp. 1-7.

Nativ et al., "Dia-nanofiltration-electrodialysis hybrid process for selective removal of monovalent ions from Mg2+ rich brines", *Desalination*, 481 (2020), pp. 1-12.

Peters, C.D. et al., "Osmotically assisted reverse osmosis (OARO): Five approaches to dewatering saline brines using pressure-driven membrane processes", *Department of Engineering Science, The University of Oxford*, 17 pages, 2018.

Tang et al., "Highly-selective separation of divalent ions from seawater and seawater RO retentate", *Separation and Purification Technology*, 175 (2017), pp. 460-468.

Tang et al., "Selective separation of divalent ions from seawater using an integrated ion-exchange/nanofiltration approach", *Chemical Engineering & Processing: Process Intensification*, 126 (2018), pp. 8-15.

Weingerger, A. et al., "By-products from saline water conversion plants", *American Cyanamid Company*, 110, 74 pages, 1964.

Davis, "Zero Discharge Seawater Desalination: Integrating the Production of Freshwater, Salt, Magnesium, and Bromine," University of South Caroline Research Foundation, Agreement No. 98-FC-81-0054 with U.S. Department of the Interior, May 2006.

Hindi-language Office Action issued in Indian Application No. 202117046013 dated Apr. 1, 2022 with English translation (six (6) pages).

(56) References Cited

OTHER PUBLICATIONS

International Preliminary Report on Patentability (PCT/IB/326 & PCT/IB/373) issued in PCT Application No. PCT/US2019/047751 dated Mar. 3, 2022, including Written Opinion (PCT/ISA/237) (15) pages).

Kumar et al., "Metals recovery from seawater desalination brines: technologies, opportunities, and challenges," ACS Sustain. Chem. Eng. 9, 2021, 7704-7712.

Morillo et al., "Comparative study of brine management technologies for desalination plants," Desalination. 336, 2014, 32-49.

Roberts et al., "Impacts of desalination plant discharges on the marine environment: a critical review of published studies," Water Research. 44, 2010, 5117-5128.

Sethi et al., "Desalination Product Water Recovery and Concentrate Minimization," Denver, Colorado Water Research Foundation, 2009.

Tong et al., "The global rise of zero liquid discharge for wastewater management: drivers, technologies, and future directions," Environ. Sci. Technol. 50-13, 2016, 6846- 6855.

Xu et al., "Critical Review of Desalination Concentrate Management, Treatment and Beneficial Use," Environmental Engineering Science, 30-8, 2013, 502-514.

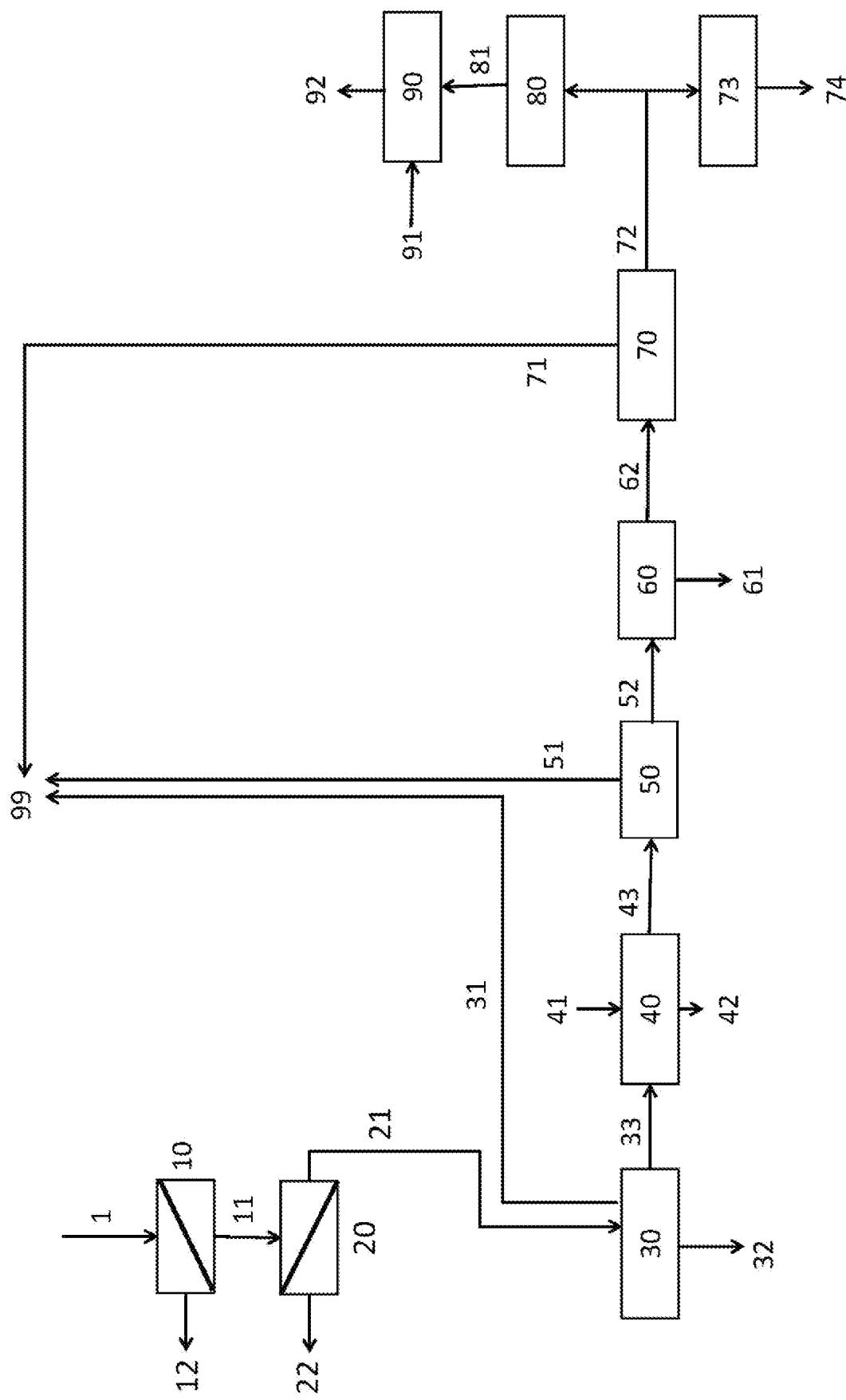

METHOD AND SYSTEM FOR EXTRACTION OF MINERALS BASED ON DIVALENT CATIONS FROM BRINE

CROSS-REFERENCE TO RELATED APPLICATIONS

This application is a continuation of U.S. application Ser. No. 17/644,121, filed Dec. 14, 2021, the contents of which is incorporated herein by reference.

FIELD OF THE DISCLOSURE

The present invention relates to the design and operation of brine treatment facilities in order to separate minerals of commercial value from the desalination of saline source water, in particular for the extraction of magnesium chloride and calcium sulfate dihydrate.

BACKGROUND OF THE INVENTION

Historically, many minerals and other materials of economic value have been extracted from seawater, either directly or via the bitterns remaining after production of commercial sodium chloride. These products include elemental bromine, magnesium metal and magnesium salts such as magnesium chloride and magnesium sulfate, calcium sulfate dihydrate (gypsum), potassium chloride and potassium sulfate (potash), calcium chloride, lithium chloride and lithium carbonate. Membrane-based brine concentration techniques, such as those described in U.S. Pat. No. 10,947,143, "Desalination Brine Concentration System and Method," have the capacity to provide more efficient and effective methods of obtaining these materials and minerals with lower inputs of chemicals and energy than conventional thermal evaporation based brine concentrators. These more efficient and effective approaches function at least in part by separating out a stream from which divalent ions are largely excluded and a stream in which the divalent ions are largely contained.

For convenience of reference, at most locations herein reference is made to "seawater" as the source water. This reference is not intended to be limiting, as the source water may be any saline water recognized by those of ordinary skill in the art as possible feed water to a desalination facility, such as brackish water, high salinity wastewater and groundwater.

In a typical nanofiltration-seawater reverse osmosis (NF-SWRO) system, approximately 25% of the initial seawater volume is rejected by the nanofiltration membrane with a significantly increased concentration of divalent anions (primarily sulfate) and divalent cations (primarily magnesium and calcium). If separated into isolated calcium and magnesium salts of acceptable purity, this nanofiltration reject stream could be a valuable source of commercial minerals.

A disadvantage of some desalination facility operations is the high costs associated with facilities, labor, high energy consumption, etc. As a result, the purified water product from such facilities has a relatively high specific cost of production per liter.

The present invention addresses these and other problems by a unique approach to divalent ion separation concentration arrangements and associated operating methods, in which, a divalent ion-rich NR-SWRO reject stream is fed into a downstream NF-SWRO unit that selectively rejects sulfate while allowing a large fraction of cations to pass through the membrane into its permeate stream. Optionally, the reduced-sulfate permeate stream may be processed through another NF-SWRO unit, whose reject stream has a reduced amount of sodium relative to the amount of magnesium in the stream.

The permeate stream from the sulfate-rejecting NF-SWRO unit, or if present, the reject stream from the sodium-reducing NF-SWRO unit then enters a combination of membrane crystallizer/brine concentrator. The crystallizer/concentrator separates the incoming stream into a magnesium-rich brine stream and a low total dissolved solids (TDS) water stream, and also produces solid calcium sulfate dihydrate. The low TDS water is suitable for use as feed water to a potable water production system. The magnesium-rich stream from the crystallizer/concentrator may be treated in a clarifier to further reduce sulfate concentration if desired, using a salt of an alkaline earth metal to precipitate out sulfate.

In order to remove sodium chloride from the magnesium-rich stream, the stream is concentrated to the sodium chloride saturation point, for example in a solar concentration pond, in a thermal process, or a membrane process. If a membrane process is used, the low TDS water stream from the concentrator is also suitable for use as feed water to a potable water production system. The now highly-concentrated magnesium-rich stream containing sodium chloride at its saturation point then enters a crystallizer to remove solid sodium chloride from the magnesium-rich stream.

The supernatant magnesium-rich stream from the crystallizer is fed into a further concentration unit to draw off additional low TDS water (also suitable for potable water production) and to generate a concentrated magnesium-rich bittern stream in preparation for production of a desired magnesium-rich product. For example, the magnesium-rich bitterns stream may be further concentrated to dryness in a crystallizer to generated hydrated magnesium chloride. Alternatively, some or all of the concentrated magnesium-rich bitterns stream may be prilled in a dry air process unit and then passed through a dryer in a hydrogen chloride atmosphere to produce anhydrous magnesium chloride. Prilling is a method of producing reasonably uniform spherical solid crystals from molten solids, strong solutions or slurries (e.g., pelletizing), essentially consisting of two operations, firstly producing liquid drops of brine and secondly solidifying them individually by cooling/evaporation as they fall through a rising ambient air stream.

Other objects, advantages and novel features of the present invention will become apparent from the following detailed description of the invention when considered in conjunction with the accompanying drawings.

BRIEF DESCRIPTION OF THE DRAWING

FIG. 1 is a schematic illustration of a process for producing magnesium chloride suitable for and electrolytic production of magnesium according to an embodiment of the present invention.

DETAILED DESCRIPTION OF THE INVENTION

FIG. 1 shows a schematic illustration of an apparatus and process for beneficiation of a divalent-ion rich reject stream produced by an NF-SWRO brine concentration system. The NF-SWRO side brine reject stream 1 is first treated with a nanofiltration unit 10 containing a nanofiltration NF-SWRO membrane 10 which is selective for rejection of sulfate but has a low selectivity for rejection of cations. This NF- SWRO membrane reduces the level of sulfate in the nanofiltration permeate 11 to less than or equal to the stoichiometric level of calcium in the permeate. The reject stream 12 from the NF-SWRO unit 10 may be discharged from the system for separate treatment and/or environmentally-acceptable disposal.

Optionally, the permeate 11 may be treated by an additional NF-SWRO unit 20 to reduce the molar ratio of sodium to magnesium in the additional NF-SWRO unit reject stream 21 to one (1) or below. As with the reject stream of the NF-SWRO unit 10, the permeate stream 22 from the NF-SWRO unit 20 may be discharged from the system for separate treatment and/or environmentally-acceptable disposal.

The NF-SWRO reject stream 22, having been treated to reduce the molar ratios of sulfate-to-calcium and sodium-to-magnesium to 1 or below, is then conveyed to a combination membrane crystallizer/brine concentrator 30 configured to produce low TDS water 31, solid calcium sulfate dihydrate 32, and concentrated magnesium-rich brine 33. The magnesium-rich stream 33 is further processed as follows.

Optionally, if the sulfate levels in the magnesium-rich stream 33 are still above desired concentrations, the magnesium-rich stream 33 may be treated to precipitate out residual sulfate in a clarifier 40. In this embodiment, the treatment includes mixing the magnesium-rich stream 33 with a soluble salt of an alkaline earth metal, thereby forming a highly insoluble salt with sulfate. The precipitated insoluble salt stream 42 is removed from the clarifier 40, and a clarified magnesium-rich stream 43 with an acceptably low level of sulfate is output from the clarifier 40.

The magnesium-rich stream 43 is next concentrated to the saturation point of sodium chloride. The concentration process may be, for example, concentration in a solar concentration pond, in a thermal process, or a membrane process 50 which produces a low TDS water output stream 51 and a concentrated magnesium-rich stream 52. The magnesium-rich stream 52 is then introduced into a crystallizer 60, such as a solar concentration pond, thermal crystallizer or membrane crystallizer, in order to produce solid sodium chloride 61.

As a product of the crystallizer 60, a supernatant product stream 62 is conveyed to an additional concentration unit 70. This additional concentration unit may be a solar concentration pond, thermal evaporation process, or membrane separation process, which generates a low TDS water output stream 71 and a concentrated magnesium-rich bittern stream 72. The magnesium-rich bittern stream 72 may be further concentrated to solid state crystals in a thermal or membrane crystallizer 73, resulting in a product consisting primarily of hydrated magnesium chloride 74.

Alternatively, the magnesium-rich bittern stream 72 may be prilled in dry air process unit 80 and dried at elevated temperature in a drying oven 90 in the presence of hydrogen chloride 91 to generate a product consisting primarily of anhydrous magnesium chloride 92.

One or more of the water streams with low total dissolved solids (TDS) 31 from the combination of membrane crystallizer/brine concentrator 30, the low TDS water output stream 51 from the concentration process 50, and/or the low TDS water output stream 71 from the concentration process 70 may be introduced as supplemental feed water into a potable water production facility 99.

In another embodiment of the treatment of the NF-SWRO reject stream output from a brine processing facility which produces magnesium chloride of acceptable quality for electrolytic production of elemental metal magnesium, the NF-SWRO reject stream is received by a NF-SWRO membrane which provides less than 90% rejection of sulfate anions and relatively poor rejection of divalent cations, in order to reduce the molar concentration of sulfate to below the molar concentration of calcium in the stream. The resulting reject stream may be sent to waste or fed back into the main saline water intake stream.

The NF permeate stream with the reduced concentration of sulfate relative to calcium is then processed through another NF-SWRO stage in which approximately 25% of the flow is rejected, with high selectivity for rejection of all multivalent species (sulfate, borate, magnesium, calcium, etc.). This treatment reduces the total volume of the reject stream to less than 5% of the incoming seawater volume, while also ensuring that the molar concentration of sodium ions in the reject stream is reduced to below the concentration of the magnesium ions. In this embodiment, the permeate stream may be sent to waste or fed back into the monovalent ion treatment stream. The reject stream may be further concentrated to total dissolved solids (TDS) concentration of 200,000 to 250,000 ppm, using brine concentration processes such as hollow fine fiber forward osmosis or osmotically assisted reverse osmosis with spiral wound or hollow fiber membranes, for example, in a process as described in U.S. Pat. No. 10,947,143, "Desalination Brine Concentration System and Method."

A membrane crystallization process may be employed to also remove calcium sulfate from the divalent ion stream, either before or after the reduction of volume of the reject stream to less than 5% of the incoming seawater volume. The resulting calcium sulfate dihydrate (gypsum) precipitate will be of quality acceptable for use as a commercial product, for example, in applications such as fertilizer and construction material. This commercially-viable product has the advantage that, as sulfate concentrations will have been reduced to below the stoichiometric level of calcium, chloride will be the only significant anion in the stream, with magnesium and sodium as the principal cations of interest and small amounts of calcium and potassium as other cations of significance. An advantage of the present invention's approach is that, by careful adjustment of the conditions of the previous NF stages, it is possible to balance the calcium and sulfate concentrations in the incoming feed streams to quantitatively remove both ions as calcium sulfate dihydrate.

Optionally, if it is desired to further reduce the residual sulfate concentrations to minimal levels, a soluble barium salt such as barium chloride or barium hydroxide may be added to precipitate barium sulfate.

The divalent ion-rich stream further may be concentrated beyond 250,000 ppm of TDS concentration using solar ponds, by membrane concentration systems, or thermal evaporation-based concentrators, in order to reach the saturation concentration of sodium chloride (approximately 360,000 ppm). Such concentration would leave a supernatant solution containing predominantly magnesium chloride and a commercially viable sodium chloride product. The supernatant solution may then be further concentrated using membrane concentration system, additional solar ponds, or thermal concentrators to near the saturation concentration of magnesium chloride (approximately 540,000 ppm). This additional concentration would produce solid magnesium chloride of sufficient quality to serve as a feedstock for electrolytic production of magnesium metal, for example by prilling in dry air followed by heating under a hydrogen chloride presence at a temperature of greater than 200° C.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS

1 NF-side brine concentration system product of NF-SWRO system
10 NF system selective for rejection of sulfate
11 sulfate-depleted NF permeate
12 sulfate-enriched NF reject
20 NF system for volume reduction
21 reject of second NF system
22 permeate of second NF system
30 membrane crystallizer/brine concentrator
31 low TDS permeate
32 calcium sulfate dihydrate (gypsum)
33 magnesium-rich brine
40 clarifier
41 soluble barium salt
42 barium sulfate
43 low-sulfate magnesium-rich brine
50 brine concentration system (solar, thermal, or membrane)
51 low TDS water output of brine concentration system
52 concentrated high purity magnesium-rich brine
60 sodium chloride crystallization system (solar, thermal, or membrane)
61 sodium chloride
62 magnesium-rich bittern
70 bittern concentration system (solar, thermal, or membrane)
71 low TDS water output of brine concentration system
72 concentrated magnesium-rich bittern
73 crystallizer (thermal or membrane)
74 hydrated magnesium chloride
80 spray dryer
81 prilled magnesium chloride hydrate
90 drying oven
91 hydrogen chloride gas
92 anhydrous magnesium chloride
99 potable water production facility

What is claimed is:

1. A system for production of minerals from divalent ion-containing brine, comprising:
a first nanofiltration seawater reverse osmosis (NF-SWRO) membrane unit configured to receive a divalent-ion rich stream and to reject sulfate while allowing divalent ions to pass into a first permeate stream;
a first concentration unit configured to receive the first permeate stream and produce solid calcium sulfate dihydrate and a magnesium-rich brine stream;
a second concentration unit configured to receive and concentrate the magnesium-rich brine stream to a saturation point of sodium chloride; and
a first crystallizing unit configured to receive the concentrated magnesium-rich brine stream and produce solid sodium chloride and a supernatant product stream.

2. The system for production of minerals from divalent ion-containing brine of claim 1, further comprising a third concentration unit configured to receive the supernatant product stream and produce a concentrated magnesium-rich bittern stream.

3. The system for production of minerals from divalent ion-containing brine of claim 1, further comprising a polishing unit configured to receive the first permeate stream and reduce a molar ratio of sodium to magnesium in the permeate stream to one or below.

4. The system for production of minerals from divalent ion-containing brine of claim 3, wherein the polishing unit is a second NF-SWRO unit.

5. The system for production of minerals from divalent ion-containing brine of claim 3, further comprising a clarifying unit configured to reduce sulfate in the magnesium-rich brine stream prior to entry of the magnesium-rich brine stream into the second concentration unit.

6. The system for production of minerals from divalent ion-containing brine of claim 5, wherein the clarifying unit is configured to reduce sulfate by use of a soluble salt of an alkaline earth metal to precipitate sulfate salt.

7. The system for production of minerals from divalent ion-containing brine of claim 1, further comprising a clarifying unit configured to reduce sulfate in the magnesium-rich brine stream prior to entry of the magnesium-rich brine stream into the second concentration unit.

8. The system for production of minerals from divalent ion-containing brine of claim 7, wherein the clarifying unit is configured to reduce sulfate by precipitating a sulfate salt using a soluble salt of an alkaline earth metal.

9. The system for production of minerals from divalent ion-containing brine of claim 1, wherein the first concentration unit is a combination membrane crystallizer/brine concentrator.

10. The system for production of minerals from divalent ion-containing brine of claim 1, wherein the first concentration unit is a membrane crystallizer.

11. The system for production of minerals from divalent ion-containing brine of claim 1, wherein the second concentration unit is a first solar concentration pond, a first thermal process, or a first membrane process.

12. The system for production of minerals from divalent ion-containing brine of claim 2, wherein the third concentration unit is a second solar concentration pond, a second thermal process, or a second membrane process.

13. A method of producing minerals from divalent ion-containing brine, comprising the steps of:
rejecting sulfate from a divalent-ion rich stream in a first nanofiltration seawater reverse osmosis (NF-SWRO) unit;
producing solid calcium sulfate dihydrate and a magnesium-rich brine stream from the first permeate stream using a first concentration unit;
concentrating the magnesium-rich brine stream to a saturation point of sodium chloride in a second concentration unit; and
producing solid sodium chloride and a supernatant product stream from the concentrated magnesium-rich brine stream in a first crystallizing unit.

14. The method of claim 13, further comprising producing a concentrated magnesium-rich bittern stream from the supernatant product stream in a third concentration unit.

15. The method of producing minerals from divalent ion-containing brine of claim 13, further comprising the step of reducing a molar ratio of sodium to magnesium in the permeate stream to one or below in a polishing unit.

16. The method of producing minerals from divalent ion-containing brine of claim 15, wherein the polishing unit is a second NF-SWRO unit.

17. The method of producing minerals from divalent ion-containing brine of claim 15, further comprising the step of reducing sulfate in the magnesium-rich brine stream in a clarifying unit prior to entry of the magnesium-rich brine stream into the second concentration unit.

18. The method of producing minerals from divalent ion-containing brine of claim 17, wherein the step of reducing sulfate in the magnesium-rich brine stream in a clarifying unit includes precipitating a sulfate salt using a soluble salt of an alkaline earth metal.

19. The method of producing minerals from divalent ion-containing brine of claim 13, further comprising the step of reducing sulfate in the magnesium-rich brine stream in a clarifying unit prior to entry of the magnesium-rich brine stream into the second concentration unit.

20. The method of producing minerals from divalent ion-containing brine of claim 19, wherein the step of reducing sulfate in the magnesium-rich brine stream in a clarifying unit includes precipitating a sulfate salt using a soluble salt of an alkaline earth metal.

\* \* \* \* \*